US011668800B2

(12) United States Patent
Sartenaer et al.

(10) Patent No.: US 11,668,800 B2
(45) Date of Patent: Jun. 6, 2023

(54) PROTECTIVE HOUSING FOR A SENSING DEVICE

(71) Applicant: AGC GLASS EUROPE, Louvain-la-Neuve (BE)

(72) Inventors: Yannick Sartenaer, Vedrin (BE); Quentin Fraselle, Mont Saint Guibert (BE); Thomas Lambricht, Perwez (BE); Jean-Francois Noulet, Grandmetz (BE); Sebastien Caliaro, Morialme (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 222 days.

(21) Appl. No.: 16/636,870

(22) PCT Filed: Aug. 2, 2018

(86) PCT No.: PCT/EP2018/070954
§ 371 (c)(1),
(2) Date: Feb. 5, 2020

(87) PCT Pub. No.: WO2019/030106
PCT Pub. Date: Feb. 14, 2019

(65) Prior Publication Data
US 2020/0371211 A1 Nov. 26, 2020

(30) Foreign Application Priority Data

Aug. 7, 2017 (EP) .................................... 17185156

(51) Int. Cl.
| *G01S 7/481* | (2006.01) |
| *C03C 4/08* | (2006.01) |
| *C03C 17/34* | (2006.01) |
| *C03C 3/091* | (2006.01) |
| *C03C 17/42* | (2006.01) |
| *C03C 3/087* | (2006.01) |
| *G01S 7/497* | (2006.01) |

(52) U.S. Cl.
CPC ............ *G01S 7/4813* (2013.01); *C03C 3/087* (2013.01); *C03C 3/091* (2013.01); *C03C 4/082* (2013.01); *C03C 17/3482* (2013.01); *C03C 17/42* (2013.01); *C03C 2217/213* (2013.01); *C03C 2217/734* (2013.01); *C03C 2217/75* (2013.01); *C03C 2218/151* (2013.01); *G01S 2007/4977* (2013.01)

(58) Field of Classification Search
None
See application file for complete search history.

(56) References Cited

U.S. PATENT DOCUMENTS

| 9,869,754 B1* | 1/2018 | Campbell ............. G01S 7/4817 |
| 2011/0255070 A1* | 10/2011 | Phillips .................... G02B 5/09 |
| | | 356/4.01 |
| 2014/0320845 A1 | 10/2014 | Bayha et al. |
| 2015/0029487 A1 | 1/2015 | Nakajima et al. |
| 2017/0082733 A1* | 3/2017 | Schwarz ................. G01S 7/483 |
| 2018/0046183 A1* | 2/2018 | Peters .................... G01S 17/931 |
| 2018/0170793 A1 | 6/2018 | Lambricht et al. |
| 2018/0194667 A1 | 7/2018 | Lambricht et al. |

FOREIGN PATENT DOCUMENTS

| DE | 10 2008 054 785 A1 | 6/2010 |
| DE | 10 2011 122 345 A1 | 6/2013 |
| KR | 10-2015-0127156 A | 11/2015 |
| WO | WO 2016/202606 A1 | 12/2016 |
| WO | WO 2016/202689 A1 | 12/2016 |

OTHER PUBLICATIONS

International Search Report dated Nov. 9, 2018 in PCT/EP2018/070954 filed on Aug. 2, 2018, 4 pages.

* cited by examiner

*Primary Examiner* — David Sample
(74) *Attorney, Agent, or Firm* — Oblon, McClelland, Maier & Neustadt, L.L.P.

(57) ABSTRACT

A detection device includes (a) a LiDAR sensing device and (b) a housing enclosing the LiDAR sensing device, the housing including at least one cover lens. At least a portion of the cover lens is made of at least one glass sheet having an absorption coefficient lower than 5 $m^{-1}$ in the wavelength range from 750 to 1650 nm. The cover lens helps to protect the LiDAR sensing device from external degradation.

22 Claims, No Drawings

PROTECTIVE HOUSING FOR A SENSING DEVICE

FIELD OF THE INVENTION

The invention relates to a detection device comprising a LiDAR sensing device and a protective housing enclosing said sensing device. Said protective housing comprises at least one cover lens. At least a portion of the cover lens is made of at least one glass sheet having an absorption coefficient lower than 5 $m^{-1}$ in the wavelength range from 750 to 1650 nm. Said protective housing provides improved protection against external degradation while maintaining excellent infrared transmission.

PRIOR ART

Infrared-based remote sensing devices, such as LiDAR sensing devices, are technologies that measure distance to a target by illuminating that target with a pulsed laser light, and measuring the reflected pulses with a sensor. Differences in laser return times and wavelengths can then be used to make digital 3D-representations of the target. These instruments are commonly used in industrial, consumer and other applications for sensing movement, position, proximity, ambient light, speed, and direction. LiDAR sensing devices have a wide range of applications which can be of airborne and terrestrial type. Airborne LiDAR sensing devices are linked to a flying device such as plane, helicopter, drone, . . . . Terrestrial applications can be both stationary or mobile. Stationary terrestrial scanning is indeed the most common survey method. Mobile scanning is used onto a moving vehicle to collect data along a path.

LiDAR sensing devices are popularly used to make high-resolution maps, with applications in amongst others agriculture for e.g. crop mapping or to apply appropriately costly fertilizer; archeology for e.g. providing an overview of broad, continuous features that may be indistinguishable on the ground; autonomous vehicles, for e.g. obstacle detection and avoidance to navigate safely through environments; atmospheric remote sensing and meteorology; military applications; physics and astronomy e.g. to measure the position of the moon, to produce precise global topographic surveys of planets; robotics for e.g. the perception of the environment as well as object classification to enable safe landing of robotic and manned vehicles with a high degree of precision; the combination of airborne and mobile terrestrial LiDAR sensing devices for surveying and mapping, wind farm optimization to e.g. to increase the energy output from wind farms by accurately measuring wind speeds and wind turbulence, solar photovoltaic deployment for e.g. optimizing solar photovoltaic systems at the city level by determining appropriate roof tops and for determining shading losses In particular, in the field of autonomous vehicles, the current industry trend is to design truly autonomous cars. To approach such self-driving future, the number of sensors in vehicles will increase significantly. LiDAR sensing devices play a critical role in this development by providing the required sensory feedback from the vehicles' 360° environment.

LiDAR sensing devices are indeed used in very different conditions and environment. The localization of the sensing devices is critical to operate at their best. They need to be located where that can have the largest and most effective overview of the target to be measured. For that reason, LiDAR sensing devices are generally very exposed to the external environment and could be damaged by the external conditions that can be very extreme and harsh. Therefore, is a need to protect LiDAR sensing devices from external degradation.

Previous generations of LiDAR sensing devices were based on the emission of one to a few light pulses. In contrast, the new generation of LiDAR is of high resolution, based on the emission and reception of an array of light pulses. These LiDAR sensing devices require very high levels of infrared transmission to map physical features with very high resolution and produce extremely accurate results. Therefore, the new generation of LiDAR sensing devices is much more demanding in terms of optical properties and is therefore not fully compatible with conventional cover lenses of a protective housing.

Conventional cover lenses can be made of plastic which provide proper infrared transmission but are very poor in terms of durability. Plastics offer indeed poor resistance to scratches, poor mechanical resistance and chemical durability. Other conventional cover lenses can use special glazings with high infrared transmission and good durability but these are very expensive and complex to produce and cannot be used in large dimensions. Further conventional cover lens are made of regular glass sheet. However, these do not provide the required infrared transmission, especially for the novel generation of LiDARS sensing devices. Therefore, there is a need for a cost effective and simple cover lens providing excellent infrared transmission as well as the required mechanical and chemical resistance to the external environment.

It has been surprisingly found that the protective housing of the present invention comprising at least one cover lens wherein at least a portion of the cover lens is made of at least one glass sheet having an absorption coefficient lower than 5 $m^{-1}$ in the wavelength range from 750 to 1650 nm provides the required high level of infrared transmission as well as the required mechanical resistance and chemical durability to a LiDAR sensing device

SUMMARY OF THE INVENTION

The present invention concerns a detection device comprising (a) a LiDAR sensing device; (b) a housing enclosing said LiDAR sensing device, and comprising at least one cover lens; characterized in that, at least a portion of the cover lens is made of at least one glass sheet having an absorption coefficient lower than 5 $m^{-1}$ in the wavelength range from 750 to 1650 nm, preferably in the range of 750 to 1050 nm, more preferably in the range of 750 to 950 nm. The present invention further concerns the use of a cover lens made of at least one glass sheet having an absorption coefficient lower than 5 m' in the wavelength range comprised between 750 and 1650 nm, preferably in the range of 750 to 1050 nm, more preferably in the range of 750 to 950 nm, to protect a LiDAR sensing device from external degradation.

DETAILED DESCRIPTION

The detection device of the present invention comprises a LiDAR sensing device and a protective housing enclosing said LiDAR sensing device. The protective housing comprises at least a cover lens wherein at least a portion of the cover lens is made of at least one glass sheet having an absorption coefficient lower than 5 m' in the wavelength range from 750 to 1650 nm.

The LiDAR sensing device of the present invention (also written Lidar, LIDAR or LADAR—being the acronym of Light Detection And Ranging) is a technology that measures distance by illuminating a target with an infrared (IR) laser light, and measuring the reflected pulses with a sensor. Distance to the target is determined by recording the time between transmitted and backscattered pulses and by using the speed of light to calculate the distance traveled. It can then be used to make digital 3D-representations of the target.

LiDARs have a wide range of applications which can be of airborne or terrestrial types. These different types of applications require scanners with varying specifications based on the data's purpose, the size of the area to be captured, the range of measurement desired, the cost of equipment, and more.

In general, a LiDAR sensing device is an optoelectronic system which is composed of several major components: (1) at least a laser transmitter. It is preferred that the laser transmitter of the LiDAR sensing device of the present invention transmits principally in infrared wavelength from 700 nm to 1mm, preferably in the near infrared wavelength 780 nm to 3 µm, more preferably in the wavelength range from 750 to 1650 nm; (2) at least a receiver comprising a light collector (telescope or other optics). Several scanning technologies are available such dual oscillating plane mirrors, combination with polygon mirrors and dual axis scanners. Optic choices affect the angular resolution and range that can be detected. A hole mirror or a beam splitter can be used as light collectors. (3) at least a photodetector which converts the light into an electrical signal; and an electronic processing chain signal that extracts the information sought. Two main photodetector technologies are generally used: solid state photodetectors, such as silicon avalanche photodiodes, or photomultipliers. LiDAR sensing devices which are mounted on mobile platforms such as airplanes or satellites, may further require instrumentation to determine their absolute position and orientation and therefore further include a position and/or navigation system.

Preferably, the LiDAR sensing device to be used in the present invention, is a new generation LiDAR sensing device based on scanning, rotating, flashing or solid state LiDAR. The scanning or rotating LiDARs are using moving lasers beams while flashing and solid state LiDAR emits light pulses which reflect off objects.

The protective housing can be made from any regular material known to make protective housing, such as any suitable metal material (aluminum, . . . ), plastic material (PVC, PVC coated with polyester, polypropylene HD, polyethylene . . . ) opaque and/or transparent, and combinations thereof. The housing shape will generally be linked to the shape of the LiDAR sensing device for better protection. LiDAR sensing devices can comprise several different parts that can be fixed or rotating. Common LiDARs' shape refers to "mushrooms-like" devices popping up the platform where they are located.

The protective housing will comprise at least one cover lens. The housing may comprise two cover lenses, one dedicated to the emission and the other dedicated to the reflection, or more.

For avoidance of doubt, visible light is defined as having wavelengths in the range of 400 to 700 nm.

According to the invention, the glass sheet has an absorption coefficient lower than 5 $m^{-1}$ in the wavelength range from 750 to 1650 nm. To quantify the low absorption of the glass sheet in the infrared range, in the present description, the absorption coefficient is used in the wavelength range from 750 to 1650 nm. The absorption coefficient is defined by the ratio between the absorbance and the optical path length traversed by electromagnetic radiation in a given environment. It is expressed in $m^{-1}$. It is therefore independent of the thickness of the material but it is function of the wavelength of the absorbed radiation and the chemical nature of the material.

In the case of glass, the absorption coefficient (1) at a chosen wavelength λ can be calculated from a measurement in transmission (T) as well as the refractive index n of the material (thick=thickness), the values of n, ρ and T being a function of the chosen wavelength λ:

$$\mu = -\frac{1}{\text{thick}} \cdot \ln\left[\frac{-(1-\rho)^2 + \sqrt{(1-\rho)^4 + 4 \cdot T^2 \cdot \rho^2}}{2 \cdot T \cdot \rho^2}\right]$$

with $\rho = (n-1)^2/(n+1)^2$.

The glass sheet according to the invention preferably has an absorption coefficient in the wavelength range of 750 to 1650 nm, generally used in optical technologies relating to the invention, very low compared to conventional glasses (as the said "clear glass" to which such a coefficient is about 30 $m^{-1}$ order). In particular, the glass sheet according to the invention has an absorption coefficient in the wavelength range from 750 to 1650 nm lower than 5 $m^{-1}$.

Preferably, the glass sheet has an absorption coefficient of lower than 3 $m^{-1}$, or even lower than 2 $m^{-1}$ and, even more preferably lower than 1 $m^{-1}$, or even lower than 0.8 $m^{-1}$.

According to a preferred embodiment of the present invention, the glass sheet has an absorption coefficient of the above mentioned values in the wavelength range of 750 to 1050 nm, preferably from 750 to 950 nm.

A low absorption presents an additional advantage that the final IR transmission is less impacted by the optical path in the material. It means that for large field of view (FOV) sensors with high aperture angles the intensity perceived at the various angles (in different areas are the image) will be more uniform.

According to the invention, the glass sheet is made of glass which may belong to different categories with the particularity of having an absorption coefficient lower than 5 $m^{-1}$ in the wavelength range from 750 to 1650 nm. The glass can thus be a soda-lime-silica type glass, aluminosilicate, boro-silicate, . . . .

Preferably, the glass sheet having a high level of near infrared radiation transmission is an extra-clear glass.

Preferably, the base glass composition of the invention comprises a total content expressed in weight percentages of glass:

| | |
|---|---|
| $SiO_2$ | 55-85% |
| $Al_2O_3$ | 0-30% |
| $B_2O_3$ | 0-20% |
| $Na_2O$ | 0-25% |
| CaO | 0-20% |
| MgO | 0-15% |
| $K_2O$ | 0-20% |
| BaO | 0-20%. |

More preferably, the base glass composition comprises according to the invention in a content, expressed as total weight of glass percentages:

| | |
|---|---|
| SiO₂ | 55-78% |
| Al₂O₃ | 0-18% |
| B₂O₃ | 0-18% |
| Na₂O | 0-20% |
| CaO | 0-15% |
| MgO | 0-10% |
| K₂O | 0-10% |
| BaO | 0-5% |

More preferably, for reasons of lower production costs, the at least one glass sheet according to the invention is made of soda-lime glass. Advantageously, according to this embodiment, the base glass composition comprises a content, expressed as the total weight of glass percentages:

| | |
|---|---|
| SiO₂ | 60-75% |
| Al₂O₃ | 0-6% |
| B₂O₃ | 0-4% |
| CaO | 0-15% |
| MgO | 0-10% |
| Na₂O | 5-20% |
| K₂O | 0-10% |
| BaO | 0-5%. |

In addition to its basic composition, the glass may include other components, nature and adapted according to quantity of the desired effect.

A solution proposed in the invention to obtain a very transparent glass in the near infrared (IR), with weak or no impact on its aesthetic or its color, is to combine in the glass composition a low iron quantity and chromium in a range of specific contents.

Thus, according to a first embodiment, the glass sheet preferably has a composition which comprises a content, expressed as the total weight of glass percentages:

| | |
|---|---|
| Fe total (expressed as Fe₂O₃) | 0.002-0.06% |
| Cr₂O₃ | 0.0001-0.06%. |

Such glass compositions combining low levels of iron and chromium showed particularly good performance in terms of infrared transmission and show a high transparency in the visible and a little marked tint, near a glass called "extra-clear".

Suitable glass compositions are described in WO2014128016A1 incorporated by reference in the present application, such as the glass sheet composition described herein below.

| | Composition A (% by weight of the composition) 1.1 |
|---|---|
| SiO₂ | 72 |
| CaO | 9 |
| K₂O | 0.3 |
| Na₂O | 14 |
| SO₃ | 0.3 |
| Al₂O₃ | 0.8 |
| MgO | 4.2 |
| Total Iron expressed in Fe₂O₃ | 100 ppm |
| Total Chromium expressed in Cr₂O₃ | 20-200 ppm |

Other suitable glass compositions are described in WO2014180679A1 incorporated by reference in the present application, such as the glass sheet composition described herein below.

| | Composition A (% by weight of the composition) 1.2 |
|---|---|
| SiO₂ | 72 |
| CaO | 8.2 |
| K₂O | 0.01 |
| Na₂O | 14 |
| SO₃ | 0.3 |
| Al₂O₃ | 1 |
| MgO | 4.5 |
| Total Iron expressed in Fe₂O₃ | 100-120 ppm |
| Total Chromium expressed in Cr₂O₃ | 3-13 ppm |

Other suitable glass compositions are described in WO2015011040A1 and WO2015011042A1 incorporated by reference in the present application, such as the glass sheet composition described herein below.

| | Composition A (% by weight of the composition) 1.3 |
|---|---|
| SiO₂ | 80 |
| B₂O₃ | 13 |
| K₂O | 1.2 |
| Na₂O | 3.5 |
| Al₂O₃ | 2.3 |
| Total Iron expressed in Fe₂O₃ | 100 ppm |
| Total Chromium expressed in Cr₂O₃ | 50 ppm |

Other suitable glass compositions are described in WO2015011041A1 incorporated by reference in the present application, such as the glass sheet composition described herein below.

| | Composition A (% by weight of the composition) 1.4 |
|---|---|
| SiO₂ | 60 |
| B₂O₃ | 8 |
| MgO | 5 |
| CaO | 8 |
| Al₂O₃ | 19 |
| Total Iron expressed in Fe₂O₃ | 100 ppm |
| Total Chromium expressed in Cr₂O₃ | 50 ppm |

Other suitable glass compositions are described in WO2015011043A1 incorporated by reference in the present application, such as the glass sheet composition described herein below.

| | Composition A (% by weight of the composition) 1.5 |
|---|---|
| SiO₂ | 57.7 |
| K₂O | 6 |
| Na₂O | 4.3 |
| Al₂O₃ | 7 |
| BaO | 8 |
| ZrO₂ | 3 |
| SrO | 7 |
| MgO | 2 |
| CaO | 5 |
| Total Iron expressed in Fe₂O₃ | 100 ppm |
| Total Chromium expressed in Cr₂O₃ | 50 ppm |

Other suitable glass compositions are described in WO2015011044A1 incorporated by reference in the present application, such as the glass sheet composition described herein below.

| | Composition A (% by weight of the composition) 1.6 |
|---|---|
| $SiO_2$ | 68.42 |
| MgO | 4.49 |
| $K_2O$ | 14.94 |
| $Na_2O$ | 0.71 |
| CaO | 9.32 |
| $Al_2O_3$ | 1.84 |
| $SO_3$ | 0.27 |
| Total Iron expressed in $Fe_2O_3$ | 0.01 |
| Total Chromium expressed in $Cr_2O_3$ (ppm) | 15-50-100 |

According to a second embodiment, the glass sheet has a composition which comprises a content, expressed as the total weight of glass percentages:

| Fe total (expressed as $Fe_2O_3$) | 0.002-0.06% |
|---|---|
| $Cr_2O_3$ | 0.0015-1% |
| Co | 0.0001-1%. |

Such chromium and cobalt based glass compositions showed particularly good performance in terms of infrared reflection while offering interesting possibilities in terms of aesthetics/color (bluish neutrality to intense coloration even up opacity). Suitable glass compositions are described in WO2015091106A1 incorporated by reference in the present application, such as the glass sheet compositions described herein below.

| | Composition A (% by weight of the composition) | | | |
|---|---|---|---|---|
| | 2.1 | 2.2 | 2.3 | 2.4 |
| $SiO_2$ | 71.71 | 71.71 | 71.71 | 71.71 |
| CaO | 8.24 | 8.24 | 8.24 | 8.24 |
| $K_2O$ | 0.02 | 0.02 | 0.02 | 0.02 |
| $Na_2O$ | 14.2 | 14.2 | 14.2 | 14.2 |
| $SO_3$ | 0.33 | 0.33 | 0.33 | 0.33 |
| $Al_2O_3$ | 1.0 | 1.0 | 1.0 | 1.0 |
| MgO | 4.5 | 4.5 | 4.5 | 4.5 |
| Total Iron expressed in $Fe_2O_3$ | 125 ppm | 86 ppm | 92 ppm | 82 ppm |
| Total Chromium expressed $Cr_2O_3$ | 44 ppm | 65 ppm | 6882 ppm | 5070 ppm |
| Co | 3.5 ppm | 41 ppm | 651 ppm | 5169 ppm |

According to a third embodiment, the glass sheets have a composition which comprises a content, expressed as the total weight of glass percentages:

| total iron (expressed as $Fe_2O_3$) | 0.02-1% |
|---|---|
| $Cr_2O_3$ | 0.002-0.5% |
| Co | 0.0001-0.5%. |

Preferably, according to this embodiment, the composition comprises: 0.06%<Total Iron≤1%.

Such compositions based on chromium and cobalt are used to obtain colored glass sheets in the blue-green range, comparable in terms of color and light transmission with blue and green glasses on the market, but with performances particularly good in terms of infrared reflection. Suitable glass compositions are described in WO2016202606A1 incorporated by reference in the present application, such as the glass sheet compositions described herein below.

| | Composition A (% by weight of the composition) | | | |
|---|---|---|---|---|
| | 3.1 | 3.2 | 3.3 | 3.4 |
| $SiO_2$ | 71.71 | 71.71 | 71.71 | 71.71 |
| CaO | 8.24 | 8.24 | 8.24 | 8.24 |
| $K_2O$ | 0.02 | 0.02 | 0.02 | 0.02 |
| $Na_2O$ | 14.2 | 14.2 | 14.2 | 14.2 |
| $SO_3$ | 0.33 | 0.33 | 0.33 | 0.33 |
| $Al_2O_3$ | 1.0 | 1.0 | 1.0 | 1.0 |
| MgO | 4.5 | 4.5 | 4.5 | 4.5 |
| Total Iron ($Fe_2O_3$) (ppm) | 400-690 | 323-432 | 310-460 | 200-740 |
| Total Chromium ($Cr_2O_3$) (ppm) | 330-545 | 230-840 | 176-490 | 97-182 |
| Co (ppm) | 29-42 | 36-152 | 44-71 | 27-35 |

According to a fourth embodiment, the glass sheet has a composition which comprises a content, expressed as the total weight of glass percentages:

| total iron (expressed as $Fe_2O_3$) | 0.002-1% |
|---|---|
| $Cr_2O_3$ | 0.001-0.5% |
| Co | 0.0001-0.5%. |
| Se | 0.0003-0.5%. |

Such glass compositions based on chromium, cobalt and selenium have shown particularly good performance in terms of infrared reflection, while offering interesting possibilities in terms of aesthetics/color (gray neutral to slight staining intense in the gray-bronze range). Suitable glass compositions are described in WO2016202689A1 incorporated by reference in the present application, such as the glass sheet composition described herein.

| | Composition A (% by weight of the composition) | | | | |
|---|---|---|---|---|---|
| | 4.1 | 4.2 | 4.3 | 4.4 | 4.5 |
| $SiO_2$ | 71.71 | 71.71 | 71.71 | 71.71 | 71.71 |
| CaO | 8.24 | 8.24 | 8.24 | 8.24 | 8.24 |
| $K_2O$ | 0.02 | 0.02 | 0.02 | 0.02 | 0.02 |
| $Na_2O$ | 14.2 | 14.2 | 14.2 | 14.2 | 14.2 |
| $SO_3$ | 0.33 | 0.33 | 0.33 | 0.33 | 0.33 |
| $Al_2O_3$ | 1.0 | 1.0 | 1.0 | 1.0 | 1.0 |
| MgO | 4.5 | 4.5 | 4.5 | 4.5 | 4.5 |
| Total Iron ($Fe_2O_3$) (ppm) | 200-431 | 670-690 | 206-400 | 750 | 480 |
| Total Chromium ($Cr_2O_3$) (ppm) | 133-288 | 460-800 | 137-200 | 111 | 167-168 |
| Co (ppm) | 68-70 | 204-215 | 45-38 | 36 | 44-45 |
| Se (ppm) | 200-468 | 256-560 | 341-566 | 74 | 48-53 |
| Ni (ppm) | 0-56 | 0-656 | 0-41 | 0 | 0 |

According to a first alternative embodiment, the glass sheet has a composition which comprises a content, expressed as the total weight of glass percentages:

| total iron (expressed as $Fe_2O_3$) | 0.002-0.06% |
|---|---|
| $CeO_2$ | 0.001-1%. |

Such suitable glass compositions are described in WO2015071456A1 incorporated by reference in the present application, such as the glass sheet composition described herein below.

| | Composition B (% by weight of the composition) |
|---|---|
| | 1 |
| $SiO_2$ | 72 |
| CaO | 8.2 |
| $K_2O$ | 0.01 |
| $Na_2O$ | 14 |
| $SO_3$ | 0.3 |
| $Al_2O_3$ | 1.0 |
| MgO | 4.5 |
| $Fe_2O_3$ (ppm) | 100 |
| $CeO_2$ (ppm) | 85-670-4600 |

According to another alternative embodiment, the glass has a composition which comprises a content, expressed as the total weight of glass percentages:

| total iron (expressed as $Fe_2O_3$) | 0.002-0.06%; |
|---|---| and one of the following components:
manganese (calculated as MnO) in an amount ranging from 0.01 to 1% by weight;
antimony (expressed as $Sb_2O_3$), in an amount ranging from 0.01 to 1% by weight;
arsenic (expressed as $As_2O_3$), in an amount ranging from 0.01 to 1% by weight,
Or
copper (expressed as CuO), in an amount ranging from 0.0002 to 0.1% by weight.

Such suitable glass compositions are described in WO2015172983A1 incorporated by reference in the present application, such as the glass sheet compositions described herein below.

| | Composition C (% by weight of the composition) | | |
|---|---|---|---|
| | 1 | 2 | 3 |
| $SiO_2$ | 72 | 72 | 72 |
| CaO | 8.2 | 8.2 | 8.2 |
| $K_2O$ | 0.01 | 0.01 | 0.01 |
| $Na_2O$ | 14 | 14 | 14 |
| $SO_3$ | 0.3 | 0.3 | 0.3 |
| $Al_2O_3$ | 1.0 | 1.0 | 1.0 |
| MgO | 4.5 | 4.5 | 4.5 |
| $Fe_2O_3$ (ppm) | 100 | 100 | 100 |
| MnO (ppm) | 225-467-1809 | 0 | 0 |
| $Sb_2O3$ (ppm) | 0 | 781-1542 | 0 |
| CuO (ppm) | 0 | 0 | 65-80 |

According to the present invention, the glass sheet of the cover lens within the protective housing, may be in the form of planar sheets or may be curved.

According to one embodiment of the present invention, the glass sheet has a value of light transmission in the visible wavelength range of 400 to 700 nm lower than its value of in the near infrared transmission wavelength range of 750 to 1650 nm. Particularly, according to another embodiment of the present invention, the value of light transmission in the visible range is lower than 10% and the value of near infrared transmission is higher than 50%.

It has been found that the cover lens made of the glass sheet according to the present invention provides the combined required properties of very high infrared transmission required for novel generations of LiDAR sensing devices as well as the required protective properties against external degradation. The cover lens made of the glass sheet according to the present invention provides indeed the required mechanical resistance against deformation, scratching and/or breaking. It provides as well superior chemical durability, as well as UV protection and anti-aging properties. Furthermore, such cover lenses can be processed in a simple and economical way. It allows as well the production and use of lenses with reduced weight as well as of large dimensions.

It can be advantageous to add one or more of the useful functionalities to the glass sheet of the cover lens of the present invention.

According to an advantageous embodiment of the invention, the glass sheet can be coated with at least one IR transparent absorbing (tinted) and/or reflecting coating in order to hide the un-aesthetic element of the sensor from the outside while ensuring a good level of operating performances. This coating may, for example, be composed of at least one layer of a black film or a layer of black paint having no (or very low) transmission in the visible optical range but having a high transparency in the infrared range of interest for the application. Preferably, such coating would demonstrate a transmission value in the visible optical range of maximum 15%, and a transmission value in the wavelength range from 750 to 1650 nm of at least 85%. Such paint can be made of organic compounds as, for example, commercial products manufactured by Seiko Advance Ltd. Or Teikoku Printing Ink Mfg. Co. Ltd. that can achieve transmission <5% in the 400-750 nm range and >70% in the 850-950 nm range. The coating may be provided on the external and/or internal face(s) of the cover lens, depending of its durability.

According to another embodiment of the invention, the glass sheet may be coated with a multilayer coating optimized to reflect selectively the visible range while maintaining high IR transmission. Some properties such as observed on Kromatix® product are thus sought. These properties ensure a total low IR absorbance of the complete system when such layer is deposited on adequate glass composition. The coating may be provided on the external and/or internal face(s) of the cover lens, depending of its durability.

According to another advantageous embodiment of the invention, the glass sheet is coated with at least one antireflection layer. An antireflection layer according to the invention may, for example, be a layer based on porous silica having a low refractive index or it may be composed of several layers (stack), in particular a stack of layers of dielectric material alternating layers having low and high refractive indexes and terminating in a layer having a low refractive index. Such coating may be provided on the external and/or internal face of the cover lens. A textured glass sheet may be also used. Etching or coating techniques may as well be used in order to avoid reflection. Preferably, the reflection of the treated surface would decrease from at least 1% and preferably from at least 2% if both surfaces are coated, within the concerned wavelength range.

According to another embodiment of the invention, an antireflection layer according to the invention may, for example, be a layer based on refractive index gradient layer deposited for example by ion implantation technique.

According to another embodiment of the invention, a combination of the above cited antireflection layers may be provided on the external and/or internal face of the cover lens. Preferably, the layers are deposited by PVD (soft coating). Thus, it may be possible to have a reflective coating in visible range, which also presents anti-reflective capability in IR range.

According to another advantageous embodiment of the invention, the glass sheet may be coupled with a heating system that allows the cover lens to quickly defrost or defog when the external operating conditions are unfavorable. Such heating system can be composed of a network of conductive wires, conductive patch or alternatively a silver-print network directly applied on the glass surface where an adequate power supply can be applied. Optionally, the system can also comprise a temperature sensor for dynamically triggering the heating function in case of need.

According to another advantageous embodiment of the invention, the glass sheet may be coated with a hydrophobic layer that prevents water droplets to aggregate onto the cover lens external surface in order to ensure proper sensor operation during rainy conditions. Such water repellant coating can be, for example, composed of thin molecular layers of fluoropolymers that reduces the surface energy and provides self-cleanability, anti-stain properties and improved moisture resistance among other effects.

Other suitable advantageous functionalities can be added to the glass sheet of the lens cover of the invention, in particular to provide supporting functions to further enhance the good operation of the LiDAR sensing device. Those supporting functions can be for example: the coupling with integrated detection functions for breakage, dirt, stain, rain, . . . or additional protection layers for preventing scratches, glare, stain, dirt, paint, . . . . Dedicated filters could also be integrated for polarization, phase or spectral discrimination.

The invention claimed is:

1. A detection device comprising:
   a. a LiDAR sensing device;
   b. a protective housing enclosing said LiDAR sensing device, and
   comprising at least one cover lens;
   wherein at least a portion of the cover lens is made of at least one glass sheet having an absorption coefficient lower than 5 $m^{-1}$ in the wavelength range from 750 to 1650 nm.

2. A detection device according to claim 1, wherein said glass sheet has an absorption coefficient lower than 1 $m^{-1}$ in the wavelength range from 750 to 1650 nm.

3. A detection device according to claim 1, wherein a value of light transmission of said glass sheet in the visible wavelength range of 400 to 700 nm is lower than a value in the near infrared transmission wavelength range of 750 to 1650 nm.

4. A detection device according to claim 1, wherein said glass sheet comprises a content, expressed as the total weight of glass percentages of:

| | |
|---|---|
| $SiO_2$ | 55-85% |
| $Al_2O_3$ | 0-30% |
| $B_2O_3$ | 0-20% |
| $Na_2O$ | 0-25% |
| CaO | 0-20% |
| MgO | 0-15% |
| $K_2O$ | 0-20% |
| BaO | 0-20% |
| Total iron (expressed as Fe2O3) | 0.002-0.06% |
| Cr2O3 | 0.0001-0.06%. |

5. A detection device according to claim 1, wherein said glass sheet comprises a content, expressed as the total weight of glass percentages of:

| | |
|---|---|
| $SiO_2$ | 55-85% |
| $Al_2O_3$ | 0-30% |
| $B_2O_3$ | 0-20% |
| $Na_2O$ | 0-25% |
| CaO | 0-20% |
| MgO | 0-15% |
| $K_2O$ | 0-20% |
| BaO | 0-20%. |
| Total iron (expressed as Fe2O3) | 0.002-0.06% |
| Cr2O3 | 0.0015-1% |
| Co | 0.0001-1%. |

6. A detection device according to claim 1, wherein said glass sheet comprises a content, expressed as the total weight of glass percentages of:

| | |
|---|---|
| $SiO_2$ | 55-85% |
| $Al_2O_3$ | 0-30% |
| $B_2O_3$ | 0-20% |
| $Na_2O$ | 0-25% |
| CaO | 0-20% |
| MgO | 0-15% |
| $K_2O$ | 0-20% |
| BaO | 0-20%. |
| Total iron (expressed as Fe2O3) | 0.02-1% |
| Cr2O3 | 0.002-0.5% |
| Co | 0.0001-0.5%. |

7. A detection device according to claim 1, wherein said glass sheet comprises a content, expressed as the total weight of glass percentages of:

| | |
|---|---|
| $SiO_2$ | 55-85% |
| $Al_2O_3$ | 0-30% |
| $B_2O_3$ | 0-20% |
| $Na_2O$ | 0-25% |
| CaO | 0-20% |
| MgO | 0-15% |
| $K_2O$ | 0-20% |
| BaO | 0-20%. |
| total iron (expressed as Fe2O3) | 0.002-1% |
| Cr2O3 | 0.001-0.5% |
| Co | 0.0001-0.5% |
| Se | 0.0003-0.5%. |

8. A detection device according to claim 1, wherein said glass sheet is coated with at least one near-infrared transparent layer that absorbs and/or reflects the visible light.

9. A detection device according to claim 1, wherein said glass sheet is coated with at least one antireflection layer.

10. A detection device according to claim 1, wherein said glass sheet is coupled with a heating system.

11. A detection device according to claim 1, wherein said glass sheet is coated with a hydrophobic layer.

12. A detection device according to claim 1, wherein the LIDAR sensing device is a scanning, rotating, flashing or solid state LiDAR device enabling 3D mapping, and emitting a laser beam of wavelength ranging between 750 and 1650 nm.

13. A method of protecting a LiDAR sensing device, comprising:
   providing a housing for the LiDAR sensing device, and
   providing a cover lens made of at least one glass sheet having an absorption coefficient lower than 5 $m^{-1}$ in the wavelength range comprised between 750 and 1650 nm.

14. A detection device according to claim 1, wherein said at least a portion of the cover lens is made of at least one glass sheet having an absorption coefficient lower than 5 m−1 in the wavelength range of 750 to 1050 nm.

15. A detection device according to claim 1, wherein said at least a portion of the cover lens is made of at least one glass sheet having an absorption coefficient lower than 5 m−1 in the wavelength range of 750 to 950 nm.

16. A detection device according to claim 1, wherein said glass sheet has an absorption coefficient lower than 1 $n^{-1}$ in the wavelength range from 750 to 1050 nm.

17. A detection device according to claim 1, wherein said glass sheet has an absorption coefficient lower than 1 $m^{-1}$ in the wavelength range of from 750 to 950 nm.

18. A detection device according to claim 8, wherein the at least one near-infrared transparent layer that absorbs and/or reflects the visible light is a layer of black film or layer of black paint having a transmission value in a visible optical range of a maximum of 15%, and a transmission value in the wavelength range from 750 to 1650 nm of at least 85%.

19. A detection device according to claim 9, wherein the least one antireflection layer is selected from the group consisting of a layer based on porous silica, several layers of dielectric material alternating layers having low and high refractive indexes and terminating in a layer having a low refractive index, and mixtures thereof.

20. A detection device according to claim 10, wherein the heating system is selected from a network of conductive wires, a conductive patch, a silverprint network, and combinations thereof.

21. A detection device according to claim 1, wherein the detection device is configured for use on a vehicle.

22. A detection device according to claim 1, wherein the cover lens has a coating having a transmission value in a visible optical range of a maximum of 15%, and a transmission value in the wavelength range from 750 to 1650 nm of at least 85%.

* * * * *